Aug. 14, 1928.  1,680,903
L. H. MILES
DIRIGIBLE SPOTLIGHT FOR VEHICLES
Filed May 4, 1926  2 Sheets-Sheet 1
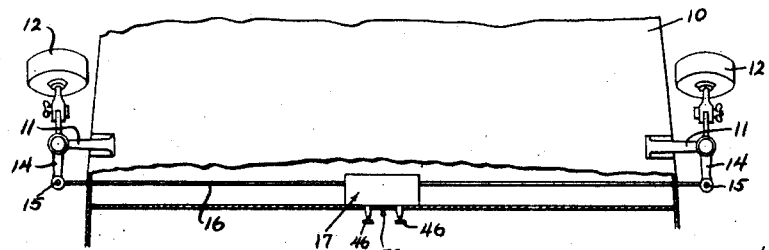
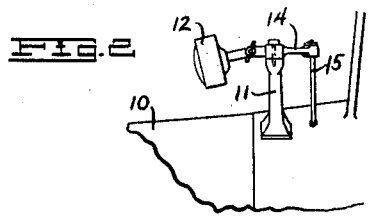
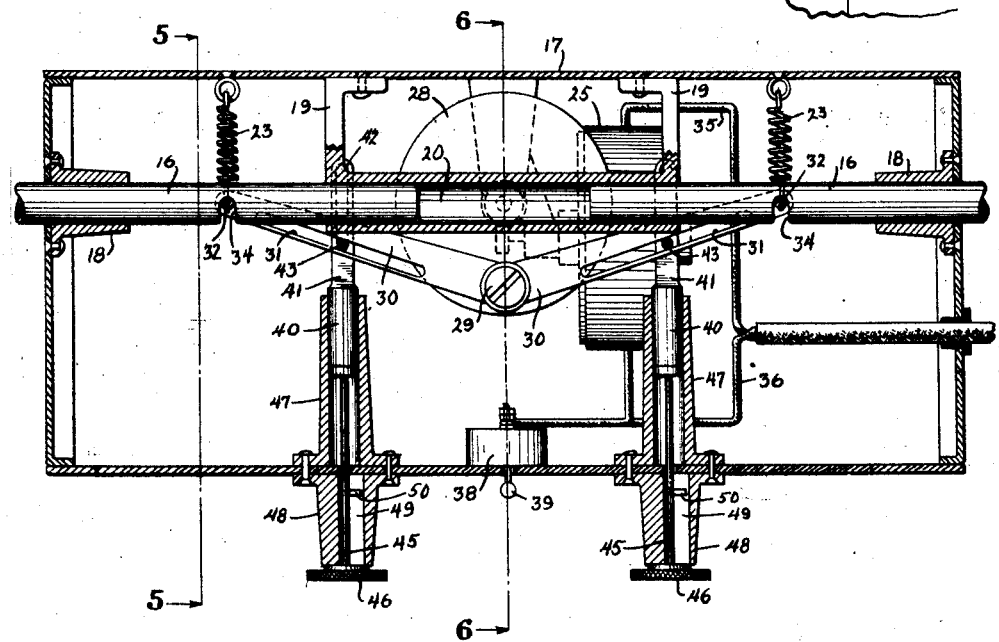
INVENTOR.
LESTER H. MILES
BY
ATTORNEY.

Aug. 14, 1928.　　　　　　　　　　　　　　　　1,680,903
L. H. MILES
DIRIGIBLE SPOTLIGHT FOR VEHICLES
Filed May 4, 1926　　　　2 Sheets-Sheet 2
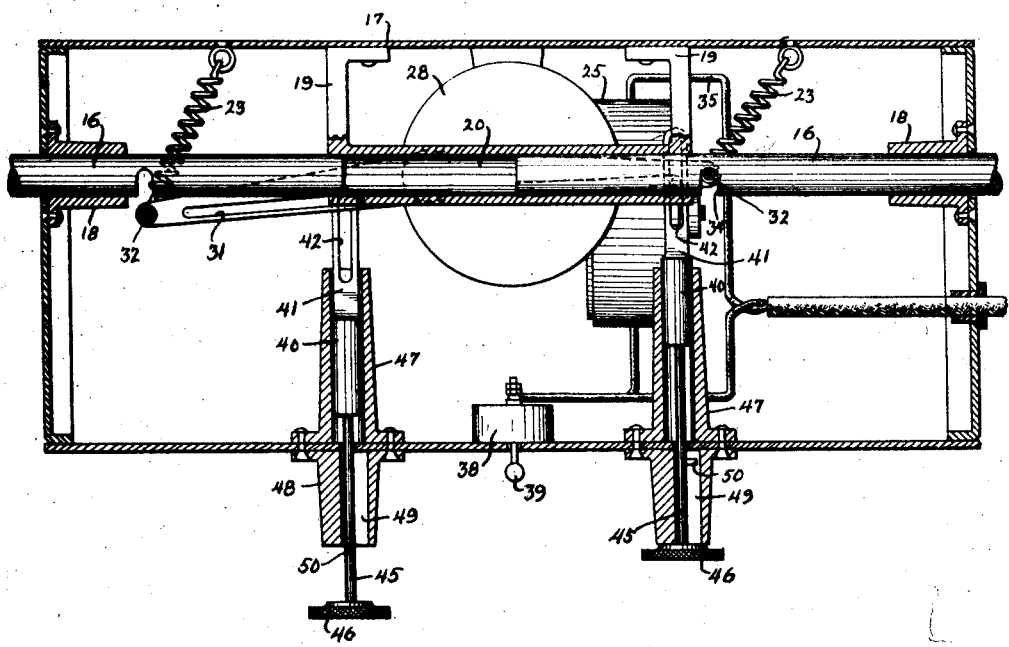
INVENTOR.
LESTER H. MILES
BY
ATTORNEY.

Patented Aug. 14, 1928.

1,680,903

UNITED STATES PATENT OFFICE.

LESTER H. MILES, OF LOS ANGELES, CALIFORNIA.

DIRIGIBLE SPOTLIGHT FOR VEHICLES.

Application filed May 4, 1926. Serial No. 106,594.

This invention relates to dirigible spot lights for vehicles.

The general object of the invention is to provide an improved spot light operating mechanism.

A specific object of the invention is to provide an improved motor operated mechanism for causing a pivotally mounted spot light to move back and forth.

Another object of the invention is to provide dirigible spot lights with electrically operated means for moving said spot lights and wherein means is provided whereby said spot lights will operate together or wherein either one of them may be made to operate singly as desired.

Other objects of the invention will be apparent from the following description taken in connection with the accompanying drawing wherein:

Fig. 1 is a diagrammatic view showing a portion of a motor vehicle equipped with my invention.

Fig. 2 is a diagrammatic view showing one of the spot lights.

Fig. 3 is a longitudinal sectional view through the casing containing the operating mechanism.

Fig. 4 is a view similar to Fig. 3 showing the parts in another position.

Figs. 5 and 6 are cross sectional views taken on lines 4—4 and 6—6, Fig. 3, respectively, and Fig. 7 is an elevation partly in section showing the operating member.

Referring to the drawing by reference characters I have shown a portion of an automobile body at 10. Upon this body 10 I mount brackets 11 at each side thereof. Upon each of the brackets 11 I pivotally mount a spot light 12. The mountings of the spot lights include projecting levers 14. Each of the levers 14 is connected to an upwardly extending portion 15 of a rod 16. The inner end of each of these rods 16 terminates in a casing 17. This casing includes bushings 18 which receive the rod. The casing also has a bracket 19 which has a cylindrical bore 20 therein in which the ends of the rods 16 reciprocate.

In order to provide means to reciprocate the rods 16 I arrange a motor 25 within the casing 17. This motor, through worm gearing 26, drives a shaft 27 which has a disc 28 thereon. This disc 28 has an eccentric pin 29 thereon which is connected to a pair of links 30 which extend in opposite directions from the disc 28. These links 30 are slotted as at 31 for a purpose to be presently described, and are provided near their extremities with pins 32. The links are normally urged upwardly by springs 33 into position so that the pins fit within notches 34 in the rods 16 and the construction is such that as the motor operates it turns the disc and moves the links 30 to cause the rods 16 to reciprocate.

The motor 25 has two leads 35 and 36 which may be connected with a suitable source of power. The lead 36 includes a switch 38 which has an operating member 39 so that the motor can be started and stopped.

In order that either of the spot lights may remain stationary while the other operates, I provide a pair of plungers 40 which are provided with an extremity 41 which is slotted as at 42. Within the slot 31 previously mentioned a pin 43 is mounted to move back and forth. The end of this pin 43 fits within the slot 42 already mentioned. The plunger 40 is provided with a stem 45 which has an operating portion 46 thereon.

The plungers move within supports 47 and the stem moves within a member 48, both of which are secured to the front wall of the casing 17. The member 48 has a slot 49 therein in which a pin 50 on the operating member 45 moves. Rotation of the operating member to the position shown at the left in Fig. 4 causes the pin to engage the end of the member 48, thereby holding the plunger in retracted position to hold the link 30 as shown at the left in said figure, so that the left hand spot light will not operate.

The operating portions 46 are preferably arranged on the instrument board of the automobile so that the driver may readily control the operation of either spot light.

From the foregoing description it will be apparent that I have provided an improved spot light operating device which can be economically manufactured and which is highly efficient in use.

Having thus described my invention, what I claim is:

1. In a device of the class described a pair of spot lights, means to pivotally mount said spot lights, an operating member for each of said spot lights, a motor, an eccentric member driven by said motor, links connected to said eccentric member, and means operatively connecting each operating member to one of said links.

2. In a device of the class described a pair of spot lights, means to pivotally mount said spot lights, a rod connected to each of said spot lights, a guide for said rods, a motor, a shaft driven by said motor, a pair of links, means operated by said motor for continuously moving said links, and means on said links engaging said rods.

3. In combination with a vehicle, a pair of spot lights, means to pivotally mount said spot lights, an operating member for said spot lights for reciprocating them, a motor, means connecting the motor to the operating members to actuate the latter, and means to cause either of said spot lights to be idle while the other is moving.

4. In a device of the class described a pair of spot lights, means to pivotally mount said spot lights, a rod on each of said spot lights, a casing into which each of said rods extend, means in said casing to guide the ends of said rods, a motor in said casing, a shaft driven by said motor, a disc on said shaft, an eccentric pin on said disc, links connected to said eccentric pin, said links having means thereon engaging said rods to move the same.

5. In a device of the class described a pair of spot lights, means to pivotally mount said spot lights, a rod connected to each of said spot lights, a casing between said spot lights into which each of said rods extend, a guide in said casing for an end of each of said rods, a motor in said casing, a shaft driven by said motor, a disc on said shaft, an eccentric pin on said disc, links connected to said eccentric pin, said rods being recessed and said links each having a pin thereon engaging in a recess, springs within said casing normally urging said last mentioned pins into the recesses, a pair of plungers slidable in said casing, each plunger having an operating member thereon, a pin carried by each of said plungers, said links having slots therein and said last mentioned pins fitting said slots whereby movement of said plungers will free said second mentioned pins from said slots, and means to hold said plungers in retracted position.

In testimony whereof, I hereunto affix my signature.

LESTER H. MILES.